July 4, 1961 J. SCHWARZ 2,991,124
BACK SUPPORTING ATTACHMENT FOR SEAT BACKS
Filed Feb. 26, 1959 4 Sheets-Sheet 1
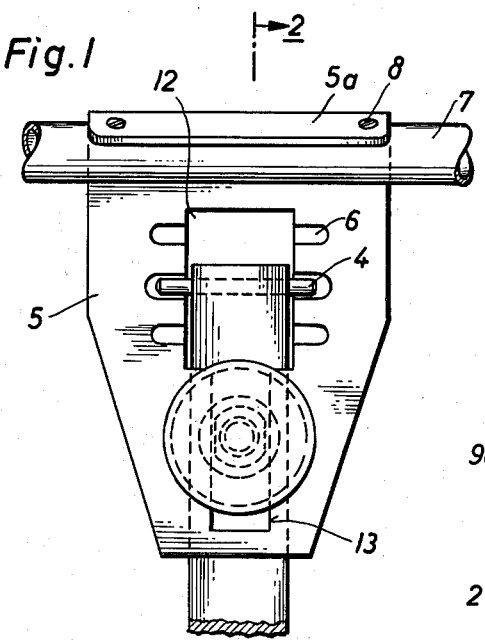
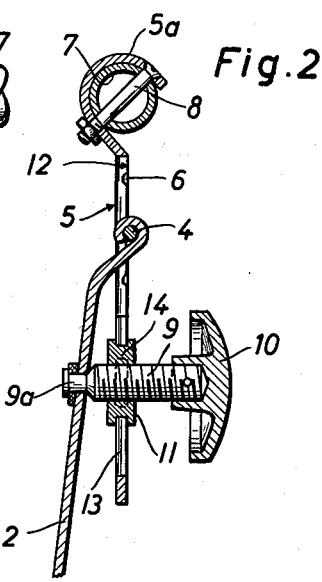
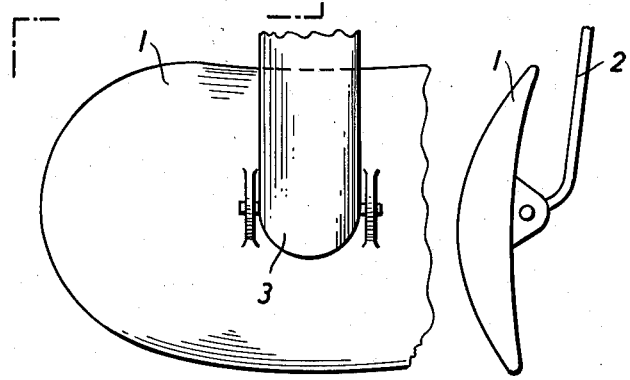
INVENTOR
Johann Schwarz
BY
Lowry & Rinehart
ATTYS.

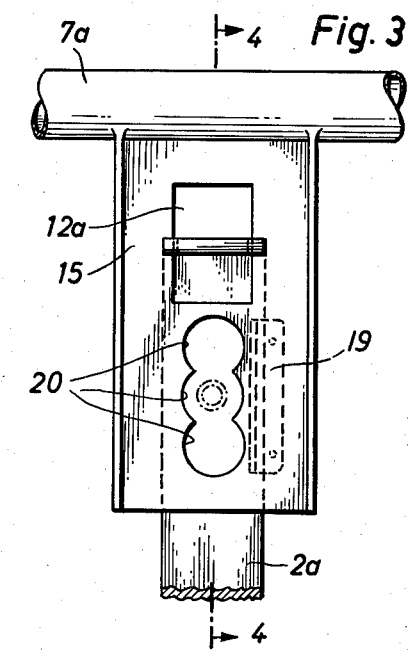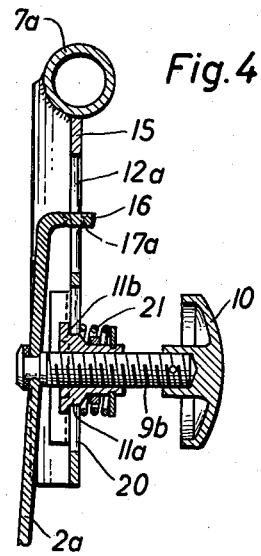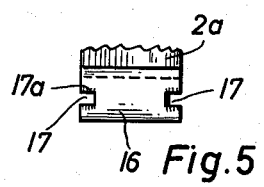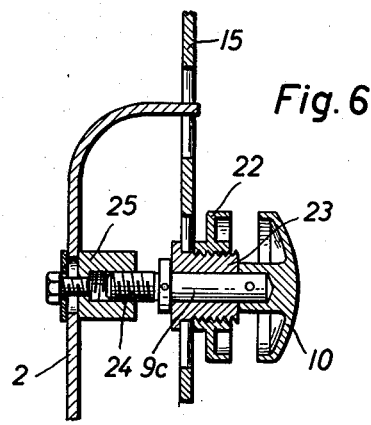

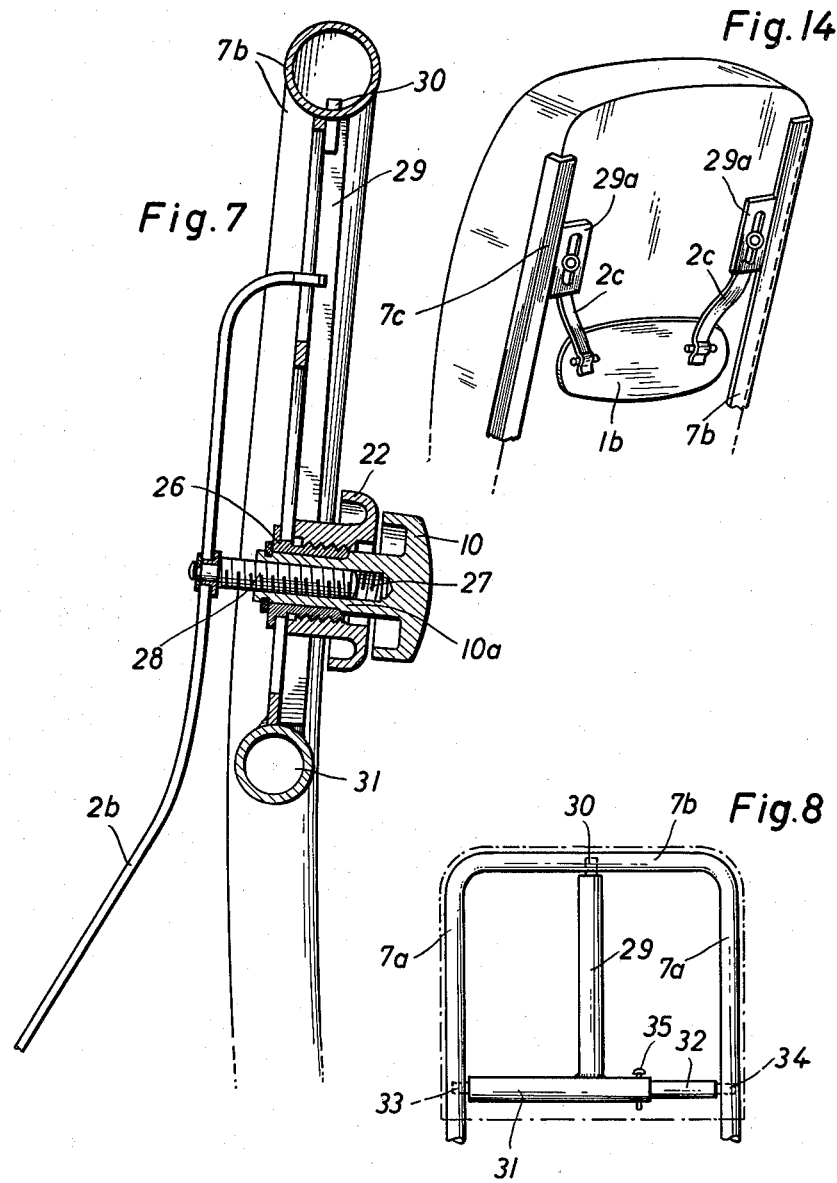

July 4, 1961 J. SCHWARZ 2,991,124
BACK SUPPORTING ATTACHMENT FOR SEAT BACKS
Filed Feb. 26, 1959 4 Sheets-Sheet 4
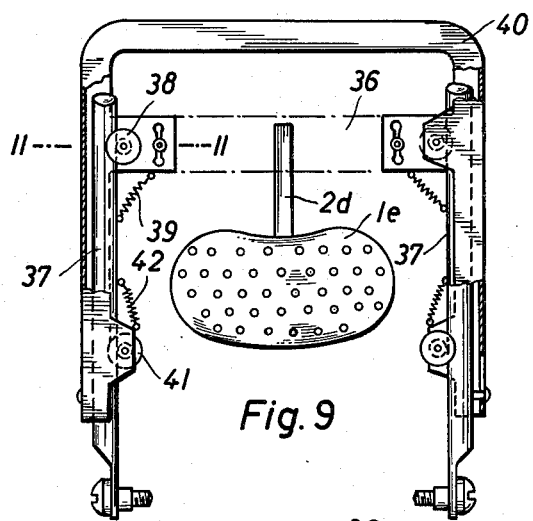
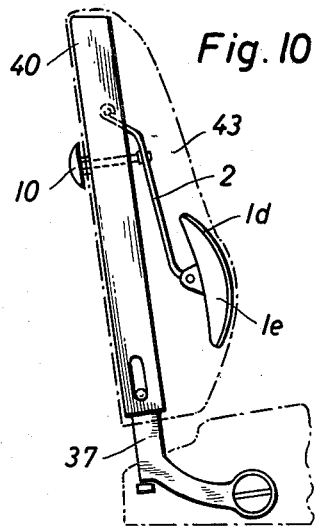
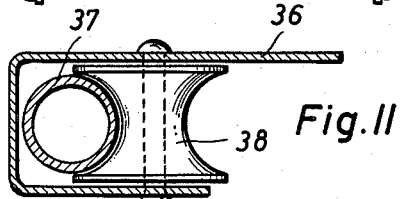
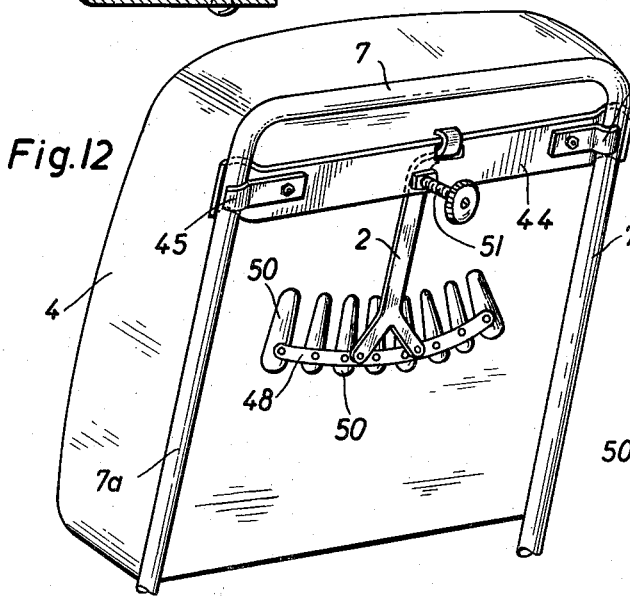
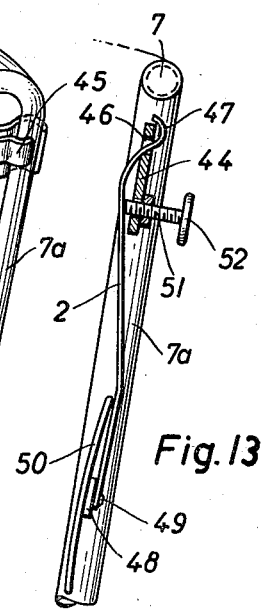
INVENTOR
Johann Schwarz
BY
Lowry & Rinehart
ATTYS.

United States Patent Office 2,991,124
Patented July 4, 1961

2,991,124
BACK SUPPORTING ATTACHMENT FOR SEAT BACKS
Johann Schwarz, Rheinalle 12, Leverkusen, Germany
Filed Feb. 26, 1959, Ser. No. 795,851
Claims priority, application Germany Feb. 27, 1958
8 Claims. (Cl. 297—284)

Seats as presently designed in general, especially those in automobiles, particularly that of the driver, give little inducement and opportunity to the seated person to take a correct sitting position from the point of view of health. In most cases, seats of this kind are provided at the back with a thick upholstery. However, even a thick upholstery does not provide for an anatomically correct sitting position of the seated person because the upholstery is yielding, thus permitting the driver to take any sitting position seemingly convenient to him but not corresponding to correct sitting from the point of view of health.

It is an object of the present invention to provide an improved design of backs, particularly for automobile seats, which give the driver a better support in sitting posture and which induce him to take a sitting position which is more favorable with respect to health. In accordance with the invention, the back face of the upholstered seat is provided with a plate or the like which is adjustable in a direction normal to the back face and supports the backbone of the driver. This plate is guided for adjustment in the direction of height and depth of the seat and is suspended with an articulated joint at a cross-tie of the back frame or a projection thereof. The mounting support for the plate which is preferably mounted for movement in all directions is advantageously a leaf spring, the upper end of which extends into an opening of the frame part or the projection and which is capable of engaging transverse notches by means of bolts. It is possible to arrange several transverse notches one below the other so that the mounting support designed as a leaf spring can be laid into one of these transverse notches of different height. The swingability of the leaf spring is achieved by means of a screw bolt which may be screwed into a sliding block displaceable in a longitudinal slot of the frame or the frame projection. The free end of the screw bolt acts against the leaf spring. Depending upon the depth the bolt is screwed in, the leaf spring and consequently the plate articulated therewith is adjusted in the direction of the seat depth.

In accordance with a further embodiment, holding and guiding of the leaf spring in the frame projection and the like may be effected by a bent-off section of the flat part which projects into the opening of the frame part by means of lateral recesses. When swinging the leaf spring in the direction of seat depth, there takes place a wedging at the edges of the opening in the frame projection. Further fixing of the leaf spring in vertical direction may be effected by jamming the sliding block. This jamming may be effected by the pressure of a helical spring or directly by tightening a handle nut.

Such an arrangement, mounting and adjustablity of the mounting members for the plate supporting the backbone of the seated person has the advantage of simplicity and easy adjustability. The arrangement is such that the mounting support can be easily removed so that the special backbone support can be turned or omitted. Furthermore, the construction is such that the entire device is capable of being subsequently mounted on existing seats without any difficulty. The device itself consists of relatively few parts and is of rigid construction.

The adjustment of the mounting support with the backbone supporting plate can also be so designed that a crosspiece bearing the plate is slidably arranged between the side members of the back frame, e.g. by means of rolls or balls, for displacement in vertical direction. The suspension of the crosspiece on springs can be effected by maintaining the crosspiece, which rolls on the side members of the frame, in a central position by means of the springs.

Several embodiments of the invention are illustrated in the appended drawings, wherein:

FIG. 1 is a fragmentary rear elevational view, broken away, of the mounting support;
FIG. 2 is a vertical longitudinal sectional view taken on line 2—2 of FIG. 1;
FIG. 3 is a fragmentary rear elevational view of another form of the invention;
FIG. 4 is a vertical longitudinal sectional view taken on line 4—4 of FIG. 3;
FIG. 5 is a fragmentary elevational view taken in the direction of the arrow V in FIG. 3;
FIG. 6 is a detail sectional view similar to FIG. 4 showing a block substitution for the spring;
FIG. 7 is a fragmentary longitudinal sectional view of another form for adjusting the supporting plate;
FIG. 8 is a fragmentary front elevational view of the device shown in FIG. 7;
FIG. 9 is a front elevational view, partly in section, of another form of mounting support;
FIG. 10 is a side edge elevational view of the device of FIG. 9;
FIG. 11 is an enlarged detail sectional view taken on line 11—11 of FIG. 9;
FIG. 12 shows in perspective a further modification of the invention attached to the back of a seat;
FIG. 13 is an edge elevational view of the mounting support of FIG. 12, and
FIG. 14 shows in perspective a still further modified construction of mounting support.

In accordance with the invention, there is provided a plate 1 to be maintaiend in the height of the backbone of the person being seated and yieldingly supporting the back in the height of the small of the back, said plate being mounted on a mounting support 2, preferably for movement in all directions, e.g. by means of a ball pivot 3. The swingability of the plate 1 in the direction of the seat depth is achieved by suspension of the mounting support with simultaneous mounting and adjustability in vertical direction and in the direction of the seat depth.

In the form of invention shown in FIGS. 1 and 2, the mounting support consists of a leaf spring 2 carrying at the lower end the plate 1 and at the upper end an independent bolt 4 which projects at both sides of the spring. This bolt serves as a hinge bolt and is engageable in pre-machined and transversely extending grooves 6 provided in the plate 5 or cross-tie of the frame. The plate 5 extends about the transversely extending pipe 7 of the back frame as at 5a, the attachment being effected by means of through-bolts 8. In this embodiment, three superposed spaced-apart grooves 6 are provided for engaging with the free ends of the bolt 4. If desired, a greater number of grooves 6 arranged at closer distances may be provided. The upper end of the spring 2 extends through the opening 12 in the plate 5.

The adjustment of the leaf spring 2 in the direction of seat depth is effected by means of a screw bolt 9 which carries a grip 10. The bolt 9 is screwed into a sliding block 11 which is displaceable in a slot 13 joining the opening 12 into which the upper part of the leaf spring 2 engages and is guided therein. The sliding block 11 is outwardly provided with a groove 14 cooperating with the edges of the slot 13. The free end of the screw bolt 9 projects into the leaf spring 2 as at 9a so that the latter is swingable in the direction of the seat depth when the screw bolt 9 is adjusted. Due to the fact that the hinge bolt 4 engages with a groove 6, the position of the leaf spring 2 and consequently of the plate 1 in their vertical positions are fixed. The engagement of the bolt head $9^a$ with the leaf spring ensures a certain flexibility of the parts with respect to each other.

In the embodiment shown in FIGS. 3 to 5, the plate 15 is permanently connected with the frame pipe $7^a$, e.g. by welding. The leaf spring $2^a$, at its upper end, has an angle end 16 provided with side notches 17. The angle end 16 engages with the opening $12^a$ such that the wall of the plate 15 engages with the notches 17. The lateral edges $17^a$ of the notches 17 may be designed like knife edges as shown in FIG. 5. The screw bolt $9^b$ is screwed into a sliding block $11^a$ and is pivotally connected with the leaf spring $2^a$ similar to the embodiment shown in FIGS. 1 and 2. To prevent rotation of the sliding block $11^a$, the same is provided with a flat side 18 engaging a stop rib 19. The sliding block $11^a$ extends into an opening 20, by the shape of which three different positions in vertical sense are fixed. By means of a compression spring 21, the sliding block $11^a$ is retained in a circular part of the opening 20. Disengagement for adjusting the height of the leaf spring 2 is effected by pressing the grip 10 on the screw $9^b$ against the action of the spring 21 until the sliding block $11^a$ comes out of the circular opening 20. It may then be moved in upward or downward direction until the central part $11^b$ snaps into a circular opening 20.

Instead of a spring 21, a handle nut 22 in accordance with FIG. 6 may be provided, which nut is screwed on a male thread of the sliding block 23. The bolt $9^c$ carrying the grip 10 is mounted in the member 23 only for rotation, but not for displacement in longitudinal direction. It is provided with a threaded bolt end 24 screwed into a nut 25 rigidly connected with the leaf spring 2.

In the embodiment shown in FIGS. 7 and 8, the grip 10 has the hollow internally threaded shank $10^a$ mounted in the sliding block 26 for rotation, but not for longitudinal displacement. It is provided with a threaded bore 27 mating with a threaded bolt 28 connected with the leaf spring $2^b$. By rotating the grip 10, the bolt 28 is screwed out to a greater or lesser extent for adjusting the leaf spring $2^b$.

The adjusting device for the support plate is exchangeably mounted in the stirrup-shaped frame $7^b$ of the seat. The member 29 on which the leaf spring $2^b$ is mounted for displacement in longitudinal direction and which carries the adjusting device 10, 22, 28, is inserted into a bore of the transversely extending part of the stirrup $7^b$ by means of a pin 30. At the lower end of the member 29 is attached a pipe 31 in which a further pipe section 32 is telescoped. The pipe sections 31, 32 engage with the side members $7^a$ of the frame $7^b$ by means of trunnions 33 and 34, respectively. The position of the telescoping pipes 31 and 32 with respect to each other can be secured by means of a shift lock screw 35 so that the device of the invention is clamped in the seat frame at three points.

In the further embodiment shown in FIGS. 9 and 10, the vertical adjustment of the plate $1^e$ is achieved due to the fact that the cross-tie rod 36 on which the leaf spring $2^d$ is suspended is mounted at the side members 37 of the back frame for displacement. For this purpose, the cross-tie rod 36 may be provided with rollers 38 embracing the side members 37. By means of compression springs 39, the cross-tie rod is retained in a definite level. To permit vertical adjustment of the back itself, a U-shaped frame 40 may be provided which embraces the side members 37 and can be likewise slidingly displaced with respect to the side members by means of rollers 41. The frame 40 is retained in a definite level by the springs 42. Instead of compression springs, rubber blocks may be used for providing springiness.

As may be seen from FIG. 10, the plate $1^e$ is given an arched shape. It may in turn be covered by an upholstery $1^d$ and is located within the cover, i.e. the upholstery 43 of the back.

In the embodiment shown in FIGS. 12 and 13, the side members $7^a$ of the seat frame are provided with a transverse holder 44 which, by means of the clamp bars 45, can embrace the side members $7^a$. The holder $2^e$ is suspendingly hinged on this transverse member 44 due to the fact that the upper crimped part of the holder $2^e$, by means of the bend 47, extends through an opening 46 and about the upper edge of the holder 44. The support plate of the invention may be arranged at the lower end of the holder $2^e$, and consists of a transversely extending part 48 which is connected thereto at 49. This part 48 bears individual supporting members 50 which may be rigidly attached to the member 48 or connected therewith by an articulated joint. The supporting members 50 are preferably slightly curved to conform to the contours of a user's back. Adjustment of the supporting device is effected by a screw 51 which is screwed into the holder 44, e.g. a flange. The screw with the handle 52 presses against the holder $2^e$ which may be rigid but springy to some extent.

FIG. 14 shows the mounting of the adjusting device of the invention on backs, the side members $7^c$ of which terminate in free ends and are not connected by cross-ties. In this case, the connecting pieces $29^a$ are directly connected with the side members $7^c$. These connecting pieces $29^a$ are of the same design as the member 29, and the leaf spring $2^c$ is the same as the leaf spring 2 shown in the other embodiments. In the case of the embodiment shown in FIG. 14, the back plate $1^b$ is held by two leaf springs $2^c$.

The back of seats in accordance with the invention is suitable not only for use in automobiles but may also be used on ordinary chairs or other seats, e.g. on office chairs, easy-chairs, and the like.

What is claimed is:

1. A back supporting attachment for seat backs comprising a support frame mounted on a seat back, a back support depending from said frame, and means vertically adjustably mounting said back support on said frame for movement relative to said seat back, said means including an elongated leaf spring adjustably connected at its upper end to the frame and carrying the back support at its lower end and a cross bar on the seat back to which the frame is mounted, and means for moving the back support forwardly and rearwardly including a block slidable in a guideway in the frame, tension means for holding the block in said guideway, a bolt slidable in the block and engaged with the leaf spring and adapted to be operated for displacing the block from the frame guideway whereby the leaf spring and back support may be vertically adjusted relative to the frame.

2. A back supporting attachment for seat backs comprising a support frame mounted on a seat back, a back support depending from said frame, and means vertically adjustably mounting said back support on said frame for movement relative to said seat back, said means including an elongated leaf spring adjustably connected at its upper end to the frame and carrying the back support at its lower end, means vertically adjustable on the frame and movably engaged with said vertically adjustable means for selectively moving the back support forwardly and rearwardly relative to the automobile seat and a cross bar on the seat back to which the frame is mounted, and means for moving the back support forwardly and rearwardly including a block slidable in a guideway in the frame, tension means for holding the block in said guideway, a bolt slidable in the block and engaged with the leaf spring and adapted to be operated for displacing the block from the frame guideway whereby the leaf spring and back support may be vertically adjusted relative to the frame.

3. A back supporting attachment for seat backs comprising a support frame mounted on a seat back, a back support depending from said frame, and means vertically adjustably mounting said back support on said frame for movement relative to said seat back, said means comprising an elongated leaf spring vertically adjustably supported at its upper end on said frame and carrying said back support at its lower end, and transverse adjusting means for positioning said back support relative to the general plane of said seat back, said transverse adjusting means comprising a block vertically adjustable in a guideway on said frame, pressure means engageable between said block and said frame for retaining said block in a vertically adjusted position, a force transmitting member adjustable transversely through said block and engageable with said leaf spring for adjustably displacing it relative to the general plane of said seat back.

4. The structure of claim 3; said pressure means comprising a compression spring concentric to said force transmitting member to impose a residual force on said block to be overcome by operation of said force transmitting member.

5. The structure of claim 3; said block being externally threaded, said pressure means comprising a nut element threadedly engaged on said block and engageable at said guideway, said force transmitting member comprising an element axially displaceable relative to said block element.

6. The structure of claim 5; said force transmitting member including an elongated screw threadedly extendable relative to said block into engagement with said leaf spring.

7. A back supporting attachment for seat backs comprising a support frame mounted on a seat back, a back support depending from said frame, and means vertically adjustably mounting said back support on said frame for movement relative to said seat back, said means including an elongated leaf spring adjustably connected only at its upper end to the frame and carrying the back support at its lower free end, and means for moving the back support forwardly and rearwardly including a block slidable in a guideway in the frame, pressure means for holding the block in said guideway, a bolt slidable in the block and engaged with the leaf spring and adapted to be operated for displacing the block from the frame guideway whereby the leaf spring and back support may be vertically adjusted relative to the frame.

8. A back supporting attachment for seat backs comprising a support frame mounted on a seat back, a back support depending from said frame, and means vertically adjustably mounting said back support on said frame for movement relative to said seat back, said means including an elongated leaf spring adjustably connected at its upper end to the frame and carrying the back support at its lower end, means vertically adjustable on the frame and movably engaged with said vertically adjustable means for selectively moving the back support forwardly and rearwardly relative to the automobile seat, and means for moving the back support forwardly and rearwardly including a block slidable in a guideway in the frame, pressure means for holding the block in said guideway, a bolt slidable in the block and engaged with the leaf spring and adapted to be operated for displacing the block from the frame guideway whereby the leaf spring and back support may be vertically adjusted relative to the frame.

References Cited in the file of this patent

UNITED STATES PATENTS

| | | |
|---|---|---|
| 856,058 | Hanger | June 4, 1907 |
| 1,264,265 | Brusius | Apr. 30, 1918 |
| 1,549,601 | Mulgrew | Aug. 11, 1925 |
| 1,551,730 | Case | Sept. 1, 1925 |
| 2,722,966 | Belyeu | Nov. 8, 1955 |

FOREIGN PATENTS

| | | |
|---|---|---|
| 762,304 | Great Britain | Nov. 28, 1956 |